United States Patent [19]
Haglund et al.

[11] Patent Number: 4,951,919
[45] Date of Patent: Aug. 28, 1990

[54] SEAL FOR GATE VALVE LINERS

[75] Inventors: Raymond E. Haglund, Hibbing; Norman H. Carlsen, Jr., Chisholm, both of Minn.

[73] Assignee: Newcon Company, Hibbing, Minn.

[21] Appl. No.: 340,047

[22] Filed: Apr. 18, 1989

[51] Int. Cl.$^5$ .............................................. F16K 3/02
[52] U.S. Cl. .................................. 251/328; 277/102; 277/188 A
[58] Field of Search ................ 251/326, 327, 328; 277/102, 110, 112, 188 A, 188 R, 207 R

[56] References Cited

U.S. PATENT DOCUMENTS

| | | | |
|---|---|---|---|
| 841,960 | 1/1907 | Gray | 251/214 |
| 1,215,833 | 2/1917 | Mason et al. | 277/207 |
| 2,893,684 | 7/1959 | Williams et al. | 251/329 |
| 2,942,841 | 6/1960 | Stillwagon | 251/326 |
| 3,050,077 | 8/1962 | Wheatley | 251/328 |
| 3,164,363 | 1/1965 | Williams | 251/329 |
| 3,194,259 | 7/1965 | Garrod . | |
| 3,350,058 | 10/1967 | Alden | 251/329 |
| 3,356,334 | 12/1967 | Scaramucci | 251/327 |
| 3,412,972 | 11/1968 | Williams et al. | 251/214 |
| 3,521,667 | 7/1970 | Johnson . | |
| 3,624,882 | 12/1971 | Gustafson . | |
| 3,749,114 | 7/1973 | Johnstone et al. | 251/329 |
| 4,026,517 | 5/1977 | Still | 251/328 |
| 4,051,863 | 10/1977 | Still | 137/454.2 |
| 4,201,365 | 5/1980 | Paptzun et al. | 251/328 |
| 4,206,905 | 6/1980 | Dobler | 251/328 |
| 4,398,731 | 8/1983 | Gorman et al. | 277/207 R |

Primary Examiner—Stephen M. Hepperle
Assistant Examiner—L. R. Leo
Attorney, Agent, or Firm—Cahill, Sutton & Thomas

[57] ABSTRACT

The collar of a one piece liner for a gate of a gate valve includes inwardly sloping entry surfaces for urging packing compressed by a packing gland against the gate to effect a seal about the gate without an increase of packing gland pressure. Bead seals disposed upon the inwardly sloping surfaces cooperate with the packing to prevent leakage intermediate the sloping surfaces and the packing. Further bead seals extending about the interior of the throat of the chest bear against the gate to serve a sealing function and to discourage migration of the packing into the throat.

4 Claims, 1 Drawing Sheet

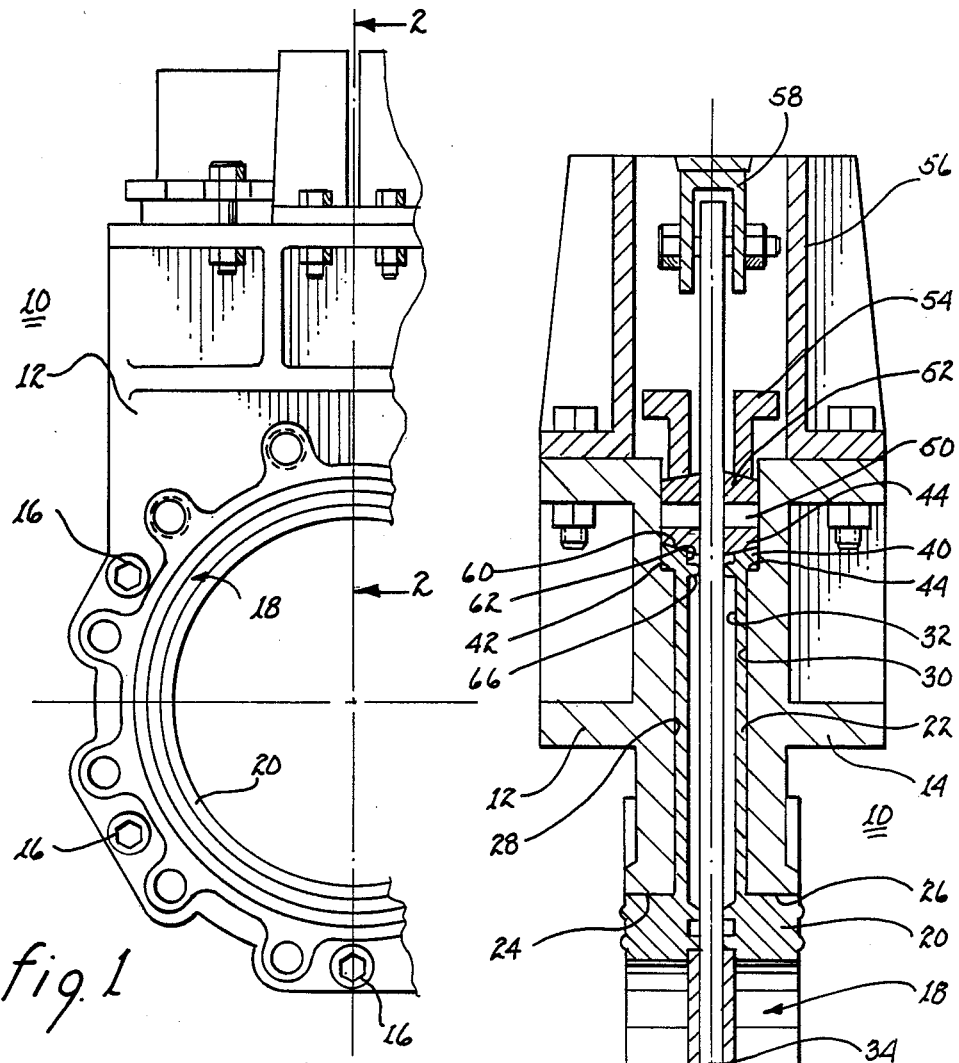
fig. 1
fig. 2
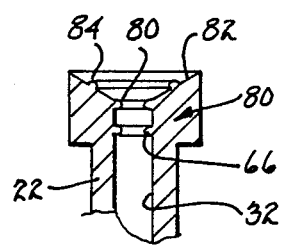
fig. 4
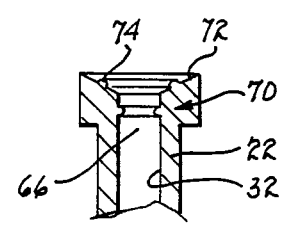
fig. 3

SEAL FOR GATE VALVE LINERS

CROSS REFERENCE TO RELATED PATENTS

The present invention is directed to gate valves and gate valve liners of the type described and illustrated in U.S. Pat. Nos. 3,993,092, 4,026,517, 4,051,863, 4,112,969 and 4,275,866, which patents are oWned by the present assignee.

BACKGROUND OF THE INVENTION

1. Field of the Invention:

The present invention relates to seals for gate valve liners and, more particularly, to seals located at the throat of a gate valve liner.

2. Description of the Prior Art:

Generally, a gate valve body is machined from a single piece casting. The chest and seat of the body are machined to receive a gate. The gate is milled with parallel opposed faces in close conformity with the valve body chest. Gate valves of this type must generally be replaced in toto after a period of use depending upon the type and consistency of the fluid flowing through the gate valve. To overcome the expenses attendant replacement of complete gate valves, individually replaceable chests, collars, backing strips and seats have been developed. U.S. Pat. No. 3,624,882 is representative of gate valves of this type. Herein, segregated elements forming the seat and seals are separately replaceable. U.S. Pat. No. 3,194,259 is directed to a gate valve having a replaceable unitary structure defining segregable and distinct elements such as the gate, gate housing, seats and gate actuating mechanisms. U.S. Pat. No. 3,521,667 is directed to a control valve having a seat element and supporting structure readily replaceable as a unit. Other U.S. Pats. describing related apparatus include Nos. 2,893,684, 2,942,841, 3,050,077, 3,164,363, 3,350,058, 3,356,334 and 3,749,114.

In the patents owned by the present assignee, there is described a replaceable one piece bore and chest liner which is enclosed within a pair of mirror image castings and collectively define the housing of a gate valve. A cast gate, enveloped within molded material in the manner of a protective covering, is translatable within the liner to effect opening and closing of the gate valve. The collar of the liner described in U.S. Pat. No. 4,026,517 includes an upper surface sloping outwardly and downwardly. A compression ring bears against the upper surface of the collar to bias a seal extending inwardly from the collar in circumscribed relationship with an inserted gate against the gate. Packing disposed above the compression ring and compressed by a packing gland performs a further sealing function. U.S. Pat. No. 4,051,863 describes a plurality of bead seals disposed within the throat of the collar of the liner and bearing against the gate. A compressive force is applied to the collar, which force is translated to the bead seals, upon attachment of a stuffing box. While these seals perform their sealing function adequately, a substantial amount of pressure must be applied to effect a good long term seal. Such pressure increases the frictional forces attendant raising and lowering of the gate and contributes to wear of the sealing elements.

SUMMARY OF THE INVENTION

An annularly expanded collar of a one piece liner includes an upper surface sloping downwardly and inwardly toward the throat of the liner to urge packing downwardly and against a gate extending upwardly from the throat to effect a seal between the surface of the gate and the packing. A bead may extend along the sloping surface to effect a seal between the sloping surface and the packing. One or more inwardly oriented beads are disposed within the throat of the liner to bear against an inserted gate and perform a wiping action and a sealing function between the gate and the chest of the liner.

It is therefore a primary object of the present invention to provide an effective low pressure seal between a one piece liner and a gate translatably disposed therein.

Another object of the present invention is to provide structure for urging migration of packing against the gate of a gate valve.

Yet another object of the present invention is to provide a one piece liner having a collar which urges packing against the surfaces of a retained gate.

Still another object of the present invention is to provide a seal between packing about a gate and the collar of a one piece liner.

A further object of the present invention is to reduce the forces attendant translation of a gate valve within a one piece liner due to gate seals.

A yet further object of the present invention is to provide an inexpensive modification of one piece liners for gate valves which increases the effectiveness of the seal between the throat of the liner and the gate.

A still further object of the present invention is to provide a method for sealing the gate within a one piece liner of a gate valve.

These and other objects of the present invention will become apparent to those skilled in the art as the description thereof proceeds.

BRIEF DESCRIPTION OF THE DRAWINGS

The present invention will be described with greater clarity and specificity with reference to the following drawings, in which:

FIG. 1 is a partial side view of a gate valve having a one piece liner disposed therein;

FIG. 2 is a partial cross sectional view taken along lines 2—2 as shown in FIG. 1;

FIG. 3 is a partial cross sectional view of the collar and chest of a one piece liner; and FIG. 4 illustrates a partial cross sectional view of a variant of the collar of a one piece gate valve liner; and

DESCRIPTION OF THE PREFERRED EMBODIMENT

The environment of the present invention will be briefly described with joint reference to FIGS. 1 and 2. Valve body 10 is formed of a pair of castings 12,14, which castings may be mirror images of one another. These castings are attached to and retained adjacent one another by means of a plurality of bolts 16 extending through holes in the castings and engaging retaining nuts, or the like. A one piece liner 18 is lodged intermediate castings 12 and 14. The liner is formed of a ring 20 having a chest 22 extending upwardly therefrom. One half of the ring seats within bore 24 of casting 12 and the other half of the ring seats within bore 26 of casting 14. The chest of the liner seats within a conformingly configured recess 28 of casting 12 and the other half of the chest seats within a similarly conforming recess 30 within casting 14. A passageway 32 extends through chest 22 to receive and accommodate passage of a gate 34. A collar 40 extends about the upper edge of chest 22 and rests upon shoulders 42,44 of castings 12,14, respectively. Packing, representatively depicted and identified by numerals 48,50 and 52, is disposed above collar 40 of liner 18. This packing may be a single element or multi elements, as illustrated. A packing gland 54 is secured to castings 12 and 14 to compressively retain the packing in place.

In the gate valve illustrated, a yoke 56 may extend upwardly from gate valve 10 to support a mechanism, including link 58, for raising and lowering gate 34. Various mechanisms for use in raising and lowering the gate may be employed. Variants of such mechanisms are illustrated in the above identified patents assigned to the present assignee.

Referring particulary to FIG. 2, the configuration and operation of the sealing elements attendant collar 40 will be described in detail. The collar, being generally rectangular in planform, includes an upper rectangular surface 60. This surface slopes downwardly and inwardly to define the opening or throat 62 of chest 22. Upon application of downward pressure upon the packing, it will bear against surface 60 to form a seal therewith. Simultaneously, due to the inward slope of surface 60, the packing will be encouraged to translate centrally of collar 40 adjacent the surfaces of gate 34 extending from throat 62. Accordingly, the packing will be urged against the surfaces of the gate and a seal is effected therebetween. The relative pressure of the seal formed against surface 60 and against the surface of the gate are a function of the angle of surface 60. Accordingly, the pressure exerted by the seal formed between the packing and the gate can be modified commensurate with the pressure of the fluid within passageway 32. Such modification may be accomplished by altering the angle of surface 60. Because of the tendency of the packing to migrate against the gate, there will be less than the leakage normally attendant prior art gate valves. The reduced leakage will, in turn, contribute to the effective life of the packing.

To augment the sealing function of the packing, a bead 66 is formed in passageway 32 to extend about and circumscribingly engage the surfaces of gate 34. Depending upon the resiliency and flexibility of the material of which liner 18 is formed, greater or lesser compression of the bead may be established. This bead serves the function of wiping the gate as it is translated upwardly and downwardly. Secondly, it serves the function of a seal to prevent fluid flow upwardly through passage 32 past collar 40. Thirdly, it reduces the pressure of any fluid which may have flowed therepast into the space intermediate bead 66 and the packing. With the reduced pressure acting against the packing, a lower sealing force may be exerted by the packing; thereby, reduced friction in translating the gate therepast is achieved.

In summary, less compressive force needs to be applied to the packing in order to achieve at least as effective seal as is available from prior art structures and there will be less friction acting upon the gate during translation of the gate. The reduced friction will lessen the forces normally attendant raising and lowering of the gate. The resulting ease of opening and closing the gate valve will be well appreciated by the gate valve operators. Further, the forces imposed upon the mechanisms for raising and lowering the gate will be less and their longevity will be enhanced.

Referring to FIG. 3, there is shown a first variant 70 of collar 40 shown in FIG. 2. The variant includes an upper inwardly and downwardly sloping surface 72, which surface is interrupted by an upwardly extending bead 74. Surface 72 serves the same function as surface 60 with respect to encouraging the packing to migrate against the surfaces of gate 34. Bead 74 serves the function of establishing a somewhat convoluted interface between the packing and surface 72. The resulting convolution assists in establishing a seal between the collar and the packing which is more effective than the seal provided by a planar surface and without requiring an increase in pressure therebetween. Bead 66 may be employed to establish a wiping action and seal between chest 22 and gate 34.

Referring to FIG. 4, there is illustrated a further variant 80 of collar 40 described above with respect to FIG. 2. Variant 80 includes an inwardly and downwardly sloping surface 82; it may also include a bead 84 extending upwardly therefrom. Surface 82 and bead 84 serve the same functions as surface 72 and bead 74 described with respect to variant 70. Moreover, a bead 66 is incorporated in variant 80 for the same purpose as bead 66 is incorporated in collar 40. A further bead 86 may be disposed within and interior of variant 80 adjacent the junction between surface 82 and passageway 32. This bead engages the surfaces of a gate disposed within chest 22. Aside from the normally expected wiping and sealing functions of bead 86, its location permits a yet further function. The pressure applied to the packing adjacent surface 82 may have a tendency to migrate into passageway 32 above bead 66. Such migration would be effectively precluded by bead 86. Accordingly, without migration of the packing, a more effective seal by the packing will be achieved at the junction between surface 82 and passageway 32.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. In a one piece liner having an upwardly extending rectangular in cross section hollow chest defining a passageway for sealingly supporting a gate of a gate valve, which gate is rectangular in cross section and extends from the top of the chest, and an apertured generally rectangular packing gland attachable to the gate valve for compressing packing about the extending gate and the top of the chest, the improvement comprising in combination:

(a) a rectangular collar disposed at the upper end of the chest; and (b) an upper surface disposed upon said collar defining an apertured rectangular surface for supporting the packing disposed about a segment of the gate extending upwardly from the chest, said surface being angled downwardly and inwardly toward the chest circumscribed gate to urge migration of the packing against the gate in response to a compressive force applied by the packing gland;

(c) at least one bead disposed within and about the passageway within the chest proximate said collar for engaging the gate and for establishing a seal between the gate and the chest; and (d) at least one further bead disposed upon and extending along said upper rectangular surface for effecting a seal and substantially immobile relationship between said surface and the packing, said one further bead defining in planform a rectangularly extending ridge.

2. The improvement as set forth in claim 1 wherein said one bead is disposed at the junction of said surface and the passageway within the chest for discouraging flow of the packing into the chest.

3. The improvement as set forth in claim 1 including a further bead disposed within and about the passageway within the chest proximate said collar and below said one bead for engaging the gate.

4. The improvement as set forth in claim 3 including means extending from said surface for increasing the effective seal between the packing and said surface.

* * * * *